US012187858B2

(12) United States Patent
Steffens et al.

(10) Patent No.: US 12,187,858 B2
(45) Date of Patent: Jan. 7, 2025

(54) METHOD FOR RECOVERING RAW MATERIALS FROM POLYURETHANE PRODUCTS

(71) Applicants: Covestro Deutschland AG, Leverkusen (DE); Covestro Intellectual Property GmbH & Co. KG, Leverkusen (DE)

(72) Inventors: Friedhelm Steffens, Leverkusen (DE); Sebastian Pohl, Langenfeld (DE); Shabnam Majidi Salehi, Cologne (DE); Jonas Krause, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 545 days.

(21) Appl. No.: 17/617,430

(22) PCT Filed: Jun. 24, 2020

(86) PCT No.: PCT/EP2020/067694
§ 371 (c)(1),
(2) Date: Dec. 8, 2021

(87) PCT Pub. No.: WO2020/260387
PCT Pub. Date: Dec. 30, 2020

(65) Prior Publication Data
US 2022/0251328 A1 Aug. 11, 2022

(30) Foreign Application Priority Data

Jun. 27, 2019 (EP) ..................................... 19182910
May 22, 2020 (EP) ..................................... 20176091
Jun. 19, 2020 (EP) ..................................... 20181175

(51) Int. Cl.
*C08J 11/24* (2006.01)

(52) U.S. Cl.
CPC ............ *C08J 11/24* (2013.01); *C08J 2375/04* (2013.01)

(58) Field of Classification Search
CPC ............................. C08J 11/24; C08J 2375/04
(Continued)

(56) References Cited

U.S. PATENT DOCUMENTS 4,336,406 A * 6/1982 Gerlock .................. C07C 41/34
568/613
4,720,326 A 1/1988 Beckhaus et al.
(Continued)

FOREIGN PATENT DOCUMENTS

DE  102012108261 A1   1/2014
EP       835901 A2 *  4/1998  ............. C08G 18/40
EP      2540702 A2    1/2013

OTHER PUBLICATIONS

Simon et al. "Recycling of polyurethanes from laboratory to industry, a journey towards the sustainability", Waste Management, US, vol. 76, 2018, pp. 147-171. (Year: 2018).*
(Continued)

*Primary Examiner* — Michael M. Bernshteyn
(74) *Attorney, Agent, or Firm* — Donald R. Palladino (57) ABSTRACT

The invention relates to a method for recovering raw materials from polyurethane products, comprising the steps of (A) providing a polyurethane product that is based on an isocyanate component and a polyol component; (B) reacting the polyurethane product with a (mono- or polyvalent) alcohol in the presence of a catalyst, thereby obtaining a first product mixture; (C) obtaining the polyols from the first product mixture, comprising (C.I) mixing, without prior removal of any water that might be contained in the first product mixture, the first product mixture obtained in step (B) with an organic solvent that is not completely miscible with the alcohol used in step (B), and phase separation into
(Continued)

a first alcohol phase and a first solvent phase; (C.II) processing the first solvent phase and obtaining polyols; and preferably (D) obtaining amines.

15 Claims, 4 Drawing Sheets

(58) Field of Classification Search
USPC .......................................................... 521/49.5
See application file for complete search history.

(56) References Cited

U.S. PATENT DOCUMENTS

| | | | |
|---|---|---|---|
| 5,714,523 A * | 2/1998 | Hopper | C08J 11/10 |
| | | | 521/49 |
| 6,359,177 B1 | 3/2002 | Brady et al. | |
| 7,307,190 B2 | 12/2007 | Pennemann et al. | |
| 10,703,713 B2 | 7/2020 | Loddenkemper et al. | |
| 2016/0145372 A1 | 5/2016 | Doroodian et al. | |
| 2020/0095194 A1 | 3/2020 | Loddenkemper et al. | |

OTHER PUBLICATIONS

Simon et al. "Recycling of polyurethanes from laboratory to industry, a journey toward the sustainability", Waste Management, US, vol. 76, (2018), pp. 147-171. (2018).*

D. Simón et al, "Recycling of polyurethanes from laboratory to industry, a journey towards the sustainability", Waste Management; Bd. 76, pp. 147-171, XP055660082, Apr. 3, 2018.

Braslaw et al, Ind. Eng. Chem. Process Des. Dev. 1984, 23, pp. 552-557.

Braslaw et al, Ind. Eng. Chem. Process Des. Dev. 1984, 23, pp. 545-551.

International Search Report, PCT/EP/2020/067694, date of mailing: Sep. 11, 2020, Authorized officer: Martin Bergmeier.

* cited by examiner

METHOD FOR RECOVERING RAW MATERIALS FROM POLYURETHANE PRODUCTS

CROSS-REFERENCE TO RELATED APPLICATION

This application is a national stage application under 35 U.S.C. § 371 of PCT/EP2020/067694, filed Jun. 24, 2020, which claims the benefit of European Application Nos. 19182910.0, filed Jun. 27, 2019, 20176091.5, filed May 22, 2020, and 20181175.9, filed Jun. 19, 2020, each of which is incorporated herein by reference.

FIELD

The project leading to the present application received funding under Grant Agreement No. 814543 as part of the European Union's Horizon 2020 research and innovation programme.

The present invention relates to a method for recovering raw materials from polyurethane products, comprising the steps of (A) providing a polyurethane product based on an isocyanate and a polyol; (B) reacting the polyurethane product with a (mono- or polyhydric) alcohol in the presence of a catalyst, to give a first product mixture; (C) recovering polyols from the first product mixture, comprising (C.I) combining the first product mixture, obtained in step (B)—and without prior removal of any water present in the first product mixture—with an organic solvent which is not fully miscible with the alcohol used in step (B), and performing phase separation into a first alcohol phase and a first solvent phase; (C.II) working up the first solvent phase to recover polyols; and preferably (D) recovering amines.

BACKGROUND

Polyurethane products enjoy a diversity of applications in industry and in everyday life. Distinctions are typically made between polyurethane foams and what are known as "CASE" products, with "CASE" being a collective term for polyurethane coatings (e.g., paints), adhesives, sealants and elastomers. The polyurethane foams are typically divided into rigid foams and flexible foams. Common to all of these products in spite of their heterogeneity is the basic polyurethane structure, which is formed by the polyaddition reaction of a (polyfunctional) isocyanate (viz. the isocyanate component of the polyurethane product) and of a polyol (viz. the polyol component of the polyurethane product) and which in the case, for example, of a polyurethane based on a diisocyanate $O=C=N-R-N=C=O$ and a diol $H-O-R'-O-H$ (where R and R' denote organic radicals) may be represented as It is the great economic success of the polyurethane products that means that there are large quantities of polyurethane waste arising (from old mattresses or seated furniture, for example) that must be sent for rational use. The mode of reuse that is the easiest to implement technically is that of incineration, with the heat of combustion released being utilized for other processes, examples being industrial production processes. However, this does not allow the raw materials loops to be completed. Another mode of reuse is that referred to as "physical recycling", which sees polyurethane wastes mechanically comminuted and used in the manufacture of new products. The obvious limits to this mode of recycling mean that there has been no lack of attempts to recover the raw materials underlying polyurethane production by rebreaking the polyurethane linkages (referred to as "chemical recycling"). These raw materials to be won back comprise primarily polyols (i.e., in the example above, $H-O-R'-O-H$). In addition it is possible through hydrolytic cleavage of the urethane bonding to recover amines as well (i.e., in the example above, $H_2N-R-NH_2$), which after workup can be phosgenated to form isocyanates (in the example above, to form $O=C=N-R-N=C=O$).

A variety of chemical recycling approaches have been developed in the past. The three foremost are briefly summarized as follows:

1. Hydrolysis of urethanes by reaction with water to recover amines and polyols with formation of carbon dioxide.
2. Glycolysis of urethanes by reaction with alcohols, where the polyols incorporated in the urethane groups are released by being replaced with the alcohol used. This process is commonly referred to in the literature as transesterification (more accurately: transurethanization). Regardless of the exact nature of the alcohol used, this mode of chemical recycling is usually dubbed glycolysis in the literature, a term that really applies only for glycol. In the present invention, therefore, the term used generally is alcoholysis.
3. Hydroglycolysis of urethane bonds by reaction with water and alcohols, where the hydrolysis and glycolysis processes described above run in parallel.

A summary of the known methods of polyurethane recycling is offered by the review article by Simón, Borreguero, Lucas and Rodriguez in *Waste Management* 2018, 76, 147-171 [1]. The article highlights glycolysis (2. above) as particularly significant. Within glycolysis, two-phase and single-phase regimes are differentiated, according to whether the obtained crude process product of reaction with the alcohol is separated into two phases or not. This depends in particular on the choice of alcohol used and on the process conditions (especially the fraction of alcohol used in the reaction mixture, and the temperature). The aforesaid review article favors the two-phase regime using crude glycerol (wastes from biodiesel production, for instance), as it is said to have the greatest potential to recover high-quality products (the focus clearly on recovering the polyols) at low production costs.

The additional use of water makes the process product of hydroglycolyses (3. above) always two-phase. Braslaw and Gerlock in *Ind. Eng. Chem. Process Des. Dev.* 1984, 23, 552-557 [2] describe the workup of this kind of process product, comprising removal of the water (by laboratory-scale phase separation or by evaporation in a process recommended for industrial use and termed the "Ford Hydroglycolysis Process") and extraction of the remaining organic phase with hexadecane to form an alcohol phase, from which amine can be recovered, and a hexadecane phase, from which polyol can be recovered. Though mentioning the option of recovering amine, the emphasis in this article too is on recovering polyols.

A patent for a process operating on these principles was granted under U.S. Pat. No. 4,336,406. Described therein is a process for recovering polyether polyol from a polyurethane by stages as follows:

(a) forming a solution by dissolving this polyurethane in a saturated alcohol having a boiling point of 225° C. to 280° C. at a temperature of 185° C. to 220° C. under a nonoxidizing atmosphere;

(b) reacting this solution under this nonoxidizing atmosphere in the presence of an alkali metal hydroxide catalyst with water for the required time so as to largely hydrolyze the hydrolyzable dissolution products to form amines and alcohol, while holding this solution at a temperature of 175° C. to 220° C., with this alkali metal hydroxide catalyst being added to the solution in an amount in the region of at least 0.1 mass %, based on the mass of this polyurethane foam;

(c) removing the water remaining after the hydrolysis from this solution under a nonoxidizing atmosphere;

(d) extracting this polyol from the hydrolyzed solution under a nonoxidizing atmosphere with an alkane that is substantially immiscible with this alcohol and has a boiling point of 230° C. to 300° C. (hexadecane in particular);
and (e) subjecting the extracted polyol to vacuum purification at a temperature below 230° C.

In step (a) the polyurethane is reacted with the alcohol groups of the saturated alcohol to form polyols, ureas and carbamates (see column 3, lines 42 to 46). Step (a) is therefore a glycolysis (more accurately: alcoholysis).

In step (b) water and alkali metal hydroxide catalyst are added to the solution obtained in step (a), either separately or in the form of an aqueous catalyst solution, causing carbamates and ureas to be decomposed into amines and alcohol. Step (b) is therefore a hydrolysis, and so steps (a) and (b) in their entirety may be interpreted as a hydroglycolysis (more accurately: hydroalcoholysis) with staggered addition of alcohol and water. Water is added in an amount such that the solution boils at temperatures between 175° C. and 200° C. Where the alcohol is diethylene glycol, the water is added in an amount of between 2.4% and 0.6%, preferably 1.1%, of the mass of the diethylene glycol used (see column 4, lines 39 to 46). Water consumed in the hydrolysis is replaced by addition of further water in order to keep the water content constant. Following hydrolysis, the water used has to be removed, in step (c) (column 5, lines 31 to 33), before the extraction can take place in step (e).

Only few of the chemical recycling processes known from the literature are operated durably on an industrial scale, and many have not even reached the piloting scale [1]. In light of the general increase in environmental awareness and of increased efforts to put industrial processes on a sustainable footing as far as possible—with both of these factors fundamentally in favor of chemical recycling—this shows apparently that the chemical recycling of polyurethane products is still far from full development from a technical and economic standpoint. Challenges lie in particular in relation to the purity of the products recovered. Polyols must be recovered as far as possible without amine impurities, so as not to have adverse effects on foaming when reused in the production of polyurethane foams, for instance. If recovery of amines is desired as well, they too must of course be obtained at maximum purity. In addition, the polyurethane products for recycling usually include various auxiliaries and adjuvants (stabilizers, catalysts and so on), which must be separated off from the actual target products of the recycling, and disposed of, in an economic and eco-friendly way. Furthermore, an economic recycling process must ensure that the reagents employed (alcohols used, for example) can as far as possible be completely recovered and used again (that is, circulated).

SUMMARY

There was therefore a need for further improvements in the field of the chemical recycling of polyurethane products. More particularly it would be desirable to be able to recover polyols, and preferably amines as well, in a high purity and efficiently from polyurethane products, and to do so especially in such a way as to make industrial deployment an economic desideratum. It would additionally be desirable to have an outlet, acceptable from the standpoints of economics and environment, for the auxiliaries and adjuvants present in the polyurethane products.

One subject of the present invention, meeting this need, is a method for recovering raw materials from polyurethane products, comprising the steps of:

(A) providing a polyurethane product based on a (polyfunctional) isocyanate (=the isocyanate component) and a polyol (=the polyol component);

(B) reacting the polyurethane product with a (mono- or polyhydric) alcohol in the presence of a catalyst, to give (with cleavage of urethane bonds) a first product mixture (comprising polyols, carbamates and the alcohol used, optionally water and also—depending in particular on the nature of the polyurethane product provided in step (A)—optionally amines, more particularly the amine corresponding to the isocyanate);

(C) working up the first product mixture (=obtaining polyols (i.e., the polyols on which the polyurethane product is based, which therefore constitute its polyol component, and/or the polyols optionally formed in step (B) from the original polyol component) from the first product mixture), comprising:

(C.I) combining the first product mixture obtained in step (B), without prior removal of any water present in the first product mixture, with an organic solvent which is not fully miscible with the alcohol used in step (B), and performing phase separation into a first alcohol phase (comprising the alcohol plus carbamates and any amines, more particularly the amine corresponding to the isocyanate) and a first solvent phase (comprising polyols);

(C.II) working up the first solvent phase to recover the polyols;

and optionally (and preferably)

(D) working up the first alcohol phase, comprising a step of hydrolyzing the carbamates (=obtaining amines from the first alcohol phase, or, in certain embodiments described later on below, from a second alcohol phase, into which the amines and/or carbamates present in the first alcohol phase are transferred).

BRIEF DESCRIPTION OF THE DRAWINGS

Various features and characteristics of the inventions described in this specification may be better understood by reference to the accompanying figures, in which.

DETAILED DESCRIPTION

Polyurethane products in the sense of the present invention are the polyaddition products (occasionally, though not entirely correctly, referred to as polycondensation products as well) of polyfunctional isocyanates (=isocyanate component of polyurethane production) and polyols (=polyol component of polyurethane production). Besides the basic polyurethane structure outlined above, polyurethane products generally include other structures as well, such as structures with urea bonds, for example. The presence of such structures departing from the pure basic polyurethane structure, alongside polyurethane structures, is not outside the scope of the present invention.

In the terminology of the present invention, the term isocyanates encompasses all isocyanates known to the skilled person in connection with polyurethane chemistry, such as, in particular, tolylene diisocyanate (TDI; prepared from tolylenediamine, TDA), the di- and polyisocyanates of the diphenylmethane series (MDI; prepared from the di- and polyamines of the diphenylmethane series, MDA), pentane 1,5-diisocyanate (PDI; prepared from 1,5-pentanediamine, PDA), hexamethylene 1,6-diisocyanate (HDI; prepared from 1,6-hexamethylenediamine, HAD), isophorone diisocyanate (IPDI; prepared from isophoronediamine, IPDA) and xylylene diisocyanate (XDI; prepared from xylylenediamine, XDA). The expression "an isocyanate" of course also embraces embodiments in which two or more different isocyanates (e.g., mixtures of MDI and TDI) have been used in the production of the polyurethane product, unless something is specifically said to the contrary, for instance using the wording "exactly one isocyanate". This is also the case within one isocyanate class (being therefore valid, for example, for different types of MDI as well). The entirety of all the isocyanates used in the production of the polyurethane product is referred to as the isocyanate component (of the polyurethane product). The isocyanate component comprises at least one isocyanate. In a similar way, the entirety of all the polyols used in the preparation of the polyurethane product is referred to as the polyol component (of the polyurethane product). The polyol component comprises at least one polyol.

Isocyanate classes in the terminology of the present invention are isocyanates having the same basic chemical structure, where differences in a substitution pattern are not regarded per se as a deviation from the basic chemical structure. For instance, TDI and MDI belong to different isocyanate classes, but not their respective isomers among one another. For example, all of the isomers of TDI (of which 2,4-TDI and 2,6-TDI are the most significant) belong to the same "TDI isocyanate class", in the same way as all isomers of the diisocyanates of the diphenylmethane series (of which 2,4'-MDI and 4,4'-MDI are the most important) belong to the same "MDI isocyanate class". The MDI products with three or more "benzene rings" as well are ascribed to the "MDI isocyanate class". The same is true correspondingly with regard to the amine classes.

In the terminology of the present invention, the term polyols encompasses all of the polyols known to the skilled person in connection with polyurethane chemistry, such as, in particular, polyether polyols, polyester polyols, polyetherester polyols and polyethercarbonate polyols. The expression "a polyol" of course also embraces embodiments in which two or more different polyols have been used in the production of the polyurethane product. This is also the case within one polyol class. With reference below, for example, to "a polyether polyol" (or "a polyester polyol", etc.), for example, this terminology also of course embraces embodiments in which two or more different polyether polyols (or two or more different polyester polyols, etc.) have been used in the production of the polyurethane product.

Carbamates in the terminology of the present invention are the urethanes formed in step (B) by the reaction with the alcohol.

An amine corresponding to an isocyanate refers to the amine through whose phosgenation the isocyanate can be obtained as follows: $R-NH_2+COCl_2 \rightarrow R-N=C=O+2 HCl$. Similarly to this, a nitro compound corresponding to an amine refers to the nitro compound through whose reduction the amine can be obtained as follows: $R-NO_2+3H_2 \rightarrow R-NH_2+2 H_2O$.

The requirement of the invention whereby the organic solvent for use in step (C.I) is not fully miscible with the alcohol used in step (B) means that under the conditions present for step (C.I) there must be a miscibility gap such that a phase separation becomes possible.

The term impurities originating from the polyurethane product refers in the context of the present invention to substances which cannot be recovered as polyols or amines in a chemical recycling operation—that is, in particular, auxiliaries and adjuvants from the production of the polyurethane product (stabilizers, catalysts, polymer particles and so on).

Figure 1:
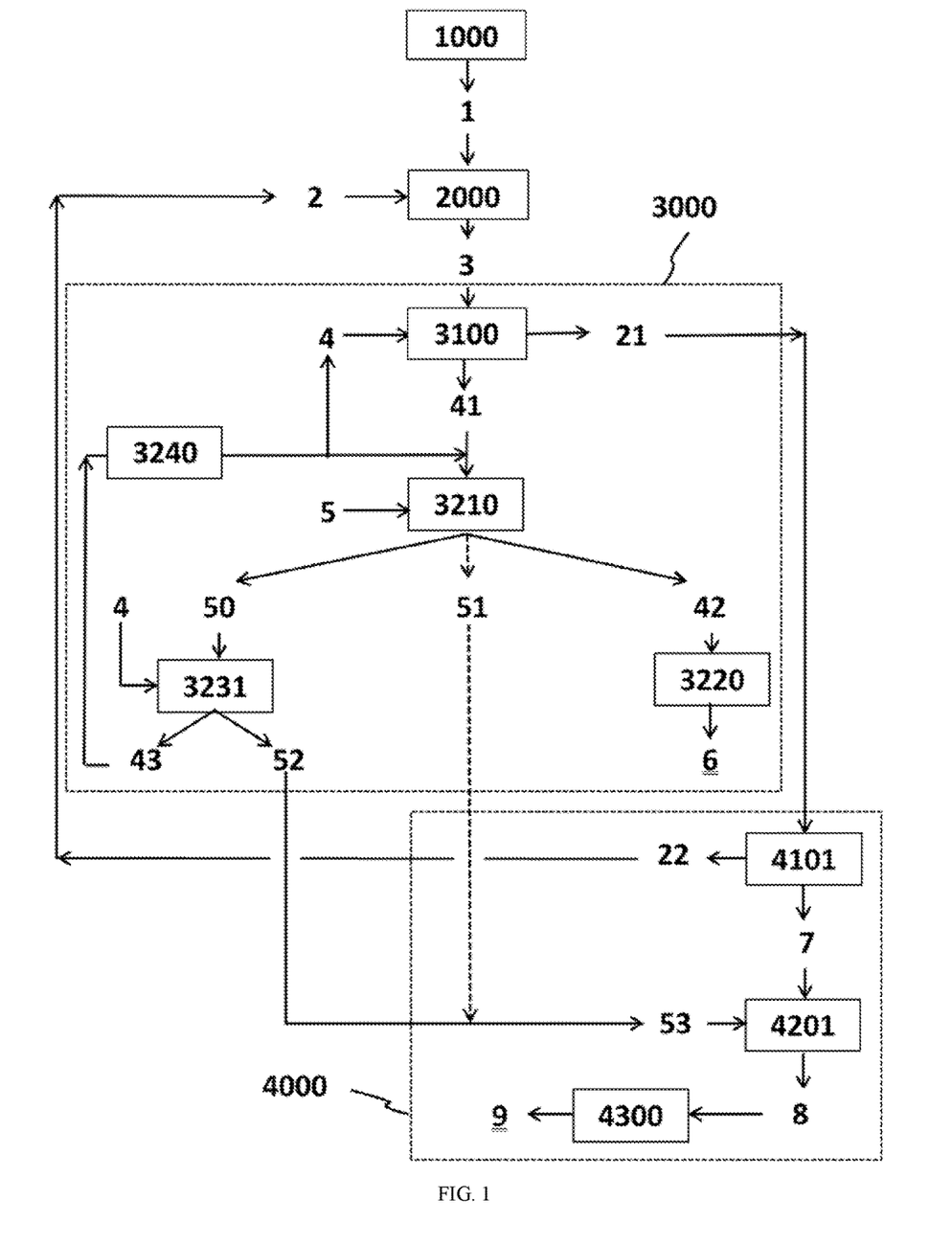
FIG. 1 shows a schematic representation of one embodiment of the method of the invention.
Figure 2:
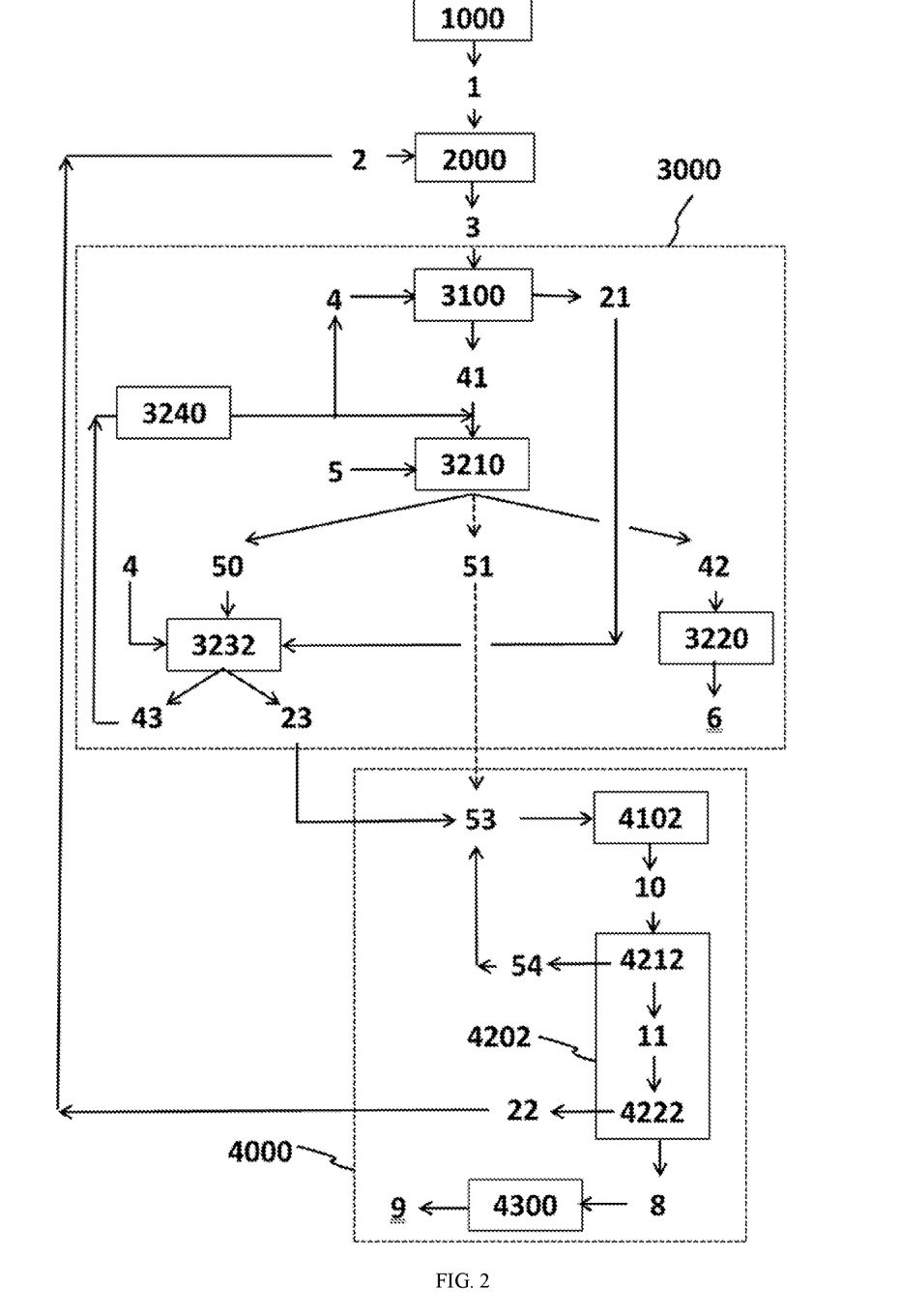
FIG. 2 shows a schematic representation of another embodiment of the method of the invention.
Figure 3:
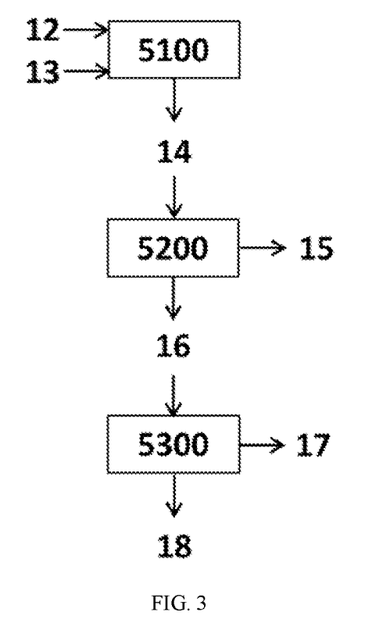
FIG. 3 shows a schematic representation of an amine preparation process which can be combined with step (D)
Figure 4:
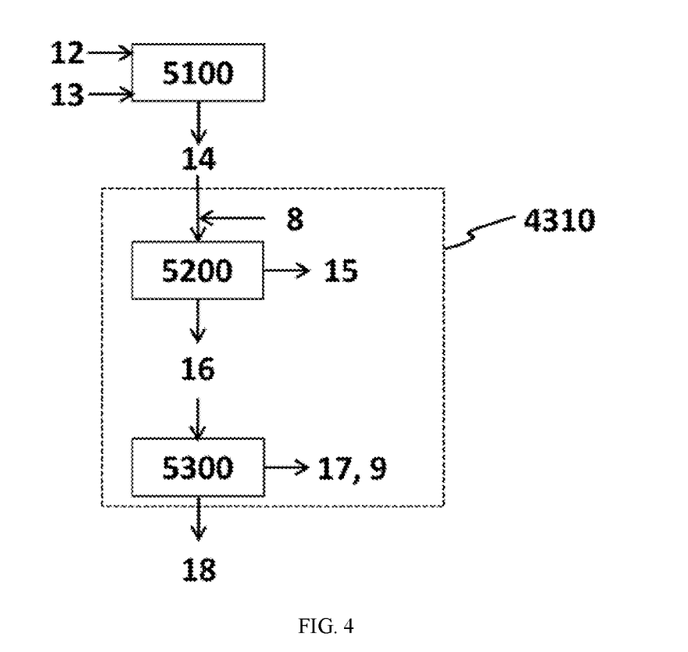
FIG. 4 shows one possible configuration of a combination of the amine preparation process with step (D)
Figure 5:
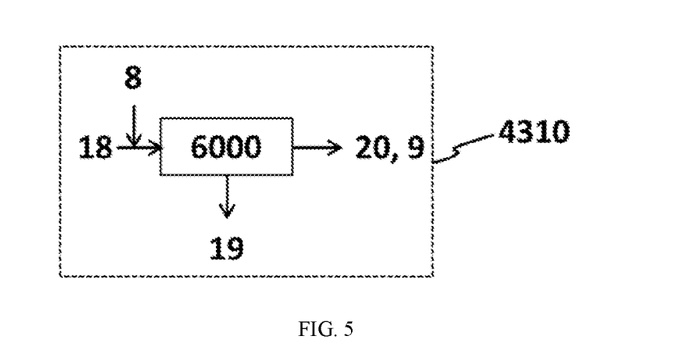
FIG. 5 shows another possible configuration of a combination of the amine preparation process with step (D).

In the appended drawings:

FIG. 1 shows a schematic representation of one embodiment of the method of the invention;

FIG. 2 shows a schematic representation of another embodiment of the method of the invention;

FIG. 3 shows a schematic representation of an amine preparation process which can be combined with step (D);

FIG. 4 shows one possible configuration of a combination of the amine preparation process with step (D); and FIG. 5 shows another possible configuration of a combination of the amine preparation process with step (D).

There follows first of all a brief summary of various possible embodiments of the invention:

In a first embodiment of the invention, which can be combined with all other embodiments, step (C.II) comprises the following:

(C.II.1) washing the first solvent phase with an aqueous washing liquid and performing phase separation into a second solvent phase (comprising polyols), an emulsion phase (comprising organic constituents, especially polyols, emulsified in aqueous washing liquid) and optionally a first aqueous phase;

(C.II.2) working up the second solvent phase to recover polyols.

In a second embodiment of the invention, which is a particular configuration of the first embodiment, step (C.II.2) comprises a distillation and/or stripping with a stripping gas (such as, in particular, nitrogen or steam, preferably nitrogen).

In a third embodiment of the invention, which is a particular configuration of the first and second embodiment, step (C.II) further comprises:

(C.II.3) combining the emulsion phase (C.II.3.a) with organic solvent (especially the same as used in step (B)) and performing phase separation into a third solvent phase and a second aqueous phase—first variant of step (C.II.3); or (C.II.3.b) with the first alcohol phase (i.e., with at least a part thereof, preferably with the entire first alcohol phase) and with organic solvent (especially the same as used in step (B)) and performing phase separation into a third solvent phase and a second alcohol phase (comprising the alcohol plus carbamates and any amines, especially the amine corresponding to the isocyanate, in other words for example TDA, if the isocyanate component comprises TDI, as is preferred)—second variant of step (C.II.3);
and
(C.II.4) returning the third solvent phase to step (C.I) or step (C.II.1).

In a fourth embodiment of the invention, which is a particular configuration of the first variant of the third embodiment, step (D) is included, and is carried out in a first variant which comprises:

(D.I.a) evaporating an alcohol fraction (optionally additionally containing additives from the polyurethane product and/or follow-on products of the catalyst used in step (B)) from the first alcohol phase obtained in step (C.I) (optionally in conjunction with a removal, before or after the evaporation, of any organic solvent present in the alcohol phase, with the term "before or after" also encompassing an embodiment of the solvent removal in which water and solvent are distilled into a joint receiver and then separated from one another by phase separation), to leave a carbamate phase;

(D.II.a) hydrolyzing the carbamate phase (optionally in the presence of a catalyst) with a water phase (more particularly with a wash water phase; see below) to give an amine phase (=an amine-water mixture; comprising impurities originating from the polyurethane product);

(D.III) recovering an amine which corresponds to an isocyanate of the isocyanate component (for example TDA, if the isocyanate component comprises TDI, as is preferred), from the amine phase (=the amine-water mixture).

In a fifth embodiment of the invention, which is a particular configuration of the second variant of the third embodiment, step (D) is included and is carried out in a second variant, which comprises:

(D.I.b) hydrolyzing the second alcohol phase (optionally in the presence of a catalyst) with a water phase, to give an amine-water-alcohol mixture (containing impurities originating from the polyurethane product);

(D.II.b) evaporating water (optionally in conjunction with a removal, before or after the evaporating, of any organic solvent present in the amine-water-alcohol mixture, where the term "before or after" also embraces an embodiment of the solvent removal in which water and solvent are distilled into a joint receiver and then separated from one another by phase separation) from the amine-water-alcohol mixture, to give an amine-alcohol mixture (containing impurities originating from the polyurethane product), followed by evaporation of an alcohol fraction (optionally additionally containing additives from the polyurethane product and/or follow-on products of the catalyst used in step (B)) from the amine-alcohol mixture, to leave an amine phase (containing impurities originating from the polyurethane product);

(D.III) recovering an amine which corresponds to an isocyanate of the isocyanate component (for example TDA, if the isocyanate component comprises TDI, as is preferred), from the amine phase.

In a sixth embodiment of the invention, which is a particular configuration of the fourth embodiment, the water phase used in step (D.II.a) comprises the second aqueous phase obtained in step (C.II.3.a) (i.e., the wash water phase from that step).

In a seventh embodiment of the invention, which is a particular configuration of the fourth to sixth embodiment, the phase separation in step (C.II.1) is carried out to give the first aqueous phase, and the water phase used in step (D.II.a) or in step (D.I.b) comprises this first aqueous phase.

In an eighth embodiment of the invention, which is a particular configuration of the fourth to seventh embodiment, the alcohol fraction obtained in step (D.I.a) or step (D.II.b) is returned (optionally after purification) to step (B).

In a ninth embodiment of the invention, which is a particular configuration of the fourth to eighth embodiment, the method further comprises the step of:

(E) providing a crude amine product fraction (not originating from one of steps (B) to (D), but instead from a process for (new) preparation of amine), the amine being the amine which is recovered in step (D.III) (i.e., in the example selected before in step (D.III): provision of a crude TDA product fraction), where the crude product fraction comprises not only this amine (in the chosen example: not only TDA) but also organic impurities boiling (at least) at a higher boiling point than this amine (in the chosen example: at a higher point than TDA);

where step (D.III) comprises:

(D.III.1) mixing the amine phase (which in the chosen example comprises TDA) with the crude product fraction and working up the resulting mixture to give the amine present in the crude product fraction (i.e., in the chosen example: TDA) together with the amine recovered from the amine phase (in the chosen example likewise TDA)—in the workup, therefore, TDA originating from the polyurethane product is obtained together with TDA originating from the crude product fraction).

In a tenth embodiment of the invention, which is a particular configuration of the ninth embodiment, the crude product fraction is taken from a bottom fraction of a distillation for purifying the amine present in the crude product fraction (in the chosen example: of a distillation for purifying TDA), where in step (D.III.1) additionally (i.e., as well as the amine present in the crude product fraction and the amine recovered from the amine phase, that is, in the chosen example: as well as TDA) a solid residue is obtained which comprises the organic impurities boiling at a higher boiling point than this amine (in the chosen example: at a higher point than TDA) (and the impurities originating from the polyurethane product).

In an eleventh embodiment of the invention, which is another particular configuration of the ninth embodiment, the crude product fraction is taken from the crude product of a process for preparing the amine present in the crude product fraction, and as well as the organic impurities boiling at a higher point than this amine (in the chosen example: at a higher point than TDA) also comprises organic impurities boiling more readily than this amine (in the chosen example: more readily than TDA) and also water, and is supplied to a distillation for removing water, in which a bottom fraction is obtained that comprises this amine (in the chosen example: TDA), organic impurities boiling more readily than this amine (in the chosen example: more readily than TDA) and organic impurities boiling at a higher point than this amine (in the chosen example: at a higher point than TDA), and also a top fraction is obtained that comprises water removed (optionally alongside residual amounts of organic impurities boiling more readily than this amine (in the chosen example therefore: more readily than TDA)).

In a twelfth embodiment of the invention, which is a particular configuration of the tenth and eleventh embodiment, step (E) comprises:
(E.I) catalytically hydrogenating the nitro compound (in the chosen example: dinitrotoluene, DNT) corresponding to the amine (in the chosen example: TDA) present in the crude product fraction, optionally in the presence of a solvent, to give a crude product comprising not only this amine (in the chosen example: not only TDA) but also organic impurities boiling at a higher point than this amine (in the chosen example: at a higher point than TDA), organic impurities boiling more readily than this amine (in the chosen example: more readily than TDA) and water;
(E.II) removing water from the crude product, to give a water-depleted method product;
(E.III) distilling the water-depleted method product, to give a distillate fraction of the amine present in the crude product fraction (i.e. of the desired amine) (in the chosen example: TDA) and a bottom fraction comprising not only this amine (in the chosen example: not only TDA) but also organic impurities boiling at a higher point than this amine (in the chosen example: at a higher point than TDA).

In a thirteenth embodiment of the invention, which can be combined with all other embodiments, the isocyanate (i.e., the isocyanate which forms the isocyanate component of the polyurethane product) is selected from the group consisting of tolylene diisocyanate (TDI), the di- and polyisocyanates of the diphenylmethane series (MDI), pentane 1,5-diisocyanate (PDI), hexamethylene 1,6-diisocyanate (HDI), isophorone diisocyanate (IPDI) and xylylene diisocyanate (XDI) and mixtures of two or more of the aforesaid isocyanates. More preferably the isocyanate which forms the isocyanate component of the polyurethane product is TDI (without other isocyanates different from it) or a mixture of TDI and MDI (without further isocyanates different from them).

In a fourteenth embodiment of the invention, which can be combined with all other embodiments, in step (C.I)
the organic solvent is selected from the group consisting of aliphatic hydrocarbons (such as, in particular pentane, heptane, hexane, octane, nonane, decane or dodecane), alicyclic hydrocarbons (such as, in particular, cyclohexane, methylcyclohexane, methylcyclopentane or cyclopentane), aromatic hydrocarbons (such as, in particular, benzene or toluene) and mixtures of two or more of the aforesaid organic solvents, and
the alcohol is selected from the group consisting of methanol, ethanol, ethylene glycol, diethylene glycol, propylene glycol, dipropylene glycol, methylglycol, triethylene glycol, glycerol, 2-methyl-1,3-propanediol and mixtures of two or more of the aforesaid alcohols.

In a fifteenth embodiment of the invention, which is a particular configuration of the fourteenth embodiment, the organic solvent comprises aliphatic, alicyclic and/or aromatic hydrocarbons and the alcohol comprises ethylene glycol, diethylene glycol, propylene glycol, dipropylene glycol, methylglycol and/or triethylene glycol.

In a sixteenth embodiment of the invention, which is a particular configuration of the fifteenth embodiment, the organic solvent comprises (more particularly: is) nonane, cyclohexane and/or toluene and the alcohol comprises (more particularly: is) diethylene glycol. Particularly preferred combinations are nonane/diethylene glycol and cyclohexane/diethylene glycol.

In a seventeenth embodiment of the invention, which can be combined with all other embodiments, the catalyst in step (B) is selected from the group consisting of alkali metal hydroxides, alkaline earth metal hydroxides, alkali metal salts of carboxylic acids (especially acetates), alkaline earth metal salts of carboxylic acids (especially acetates), Lewis acids (such as, in particular, dibutyltin dilaurate), organic amines (such as, in particular, diethanolamine), organometallic compounds (such as, in particular, titanium tetrabutoxide) and tin compounds (such as, in particular, tin octoate).

In an eighteenth embodiment of the invention, which can be combined with all other embodiments unless they are limited to polyurethane products other than polyurethane foams, the polyurethane product is a polyurethane foam.

In a nineteenth embodiment of the invention, which is a particular configuration of the eighteenth embodiment, the polyurethane foam is a flexible polyurethane foam.

In a twentieth embodiment of the invention, which is another particular configuration of the eighteenth embodiment, the polyurethane foam is a rigid polyurethane foam.

In a twenty-first embodiment of the invention, which can be combined with all other embodiments unless they are limited to polyurethane products other than polyurethane elastomers, the polyurethane product is a polyurethane elastomer.

In a twenty-second embodiment of the invention, which can be combined with all other embodiments unless they are limited to polyurethane products other than polyurethane adhesives, the polyurethane product is a polyurethane adhesive.

In a twenty-third embodiment of the invention, which can be combined with all other embodiments unless they are limited to polyurethane products other than polyurethane coatings, the polyurethane product is a polyurethane coating.

In a twenty-fourth embodiment of the invention, which can be combined with all other embodiments provided they include step (D.II.a) or step (D.I.b) (the step of hydrolyzing the carbamates), a catalyst is used in step (D.II.a) or step (D.I.b) that is selected from the group consisting of alkali metal hydroxides, alkaline earth metal hydroxides, alkali metal salts of carboxylic acids (especially acetates), alkaline earth metal salts of carboxylic acids (especially acetates), Lewis acids (such as, in particular, dibutyltin dilaurate), organic amines (such as, in particular, diethanolamine), organometallic compounds (such as, in particular, titanium tetrabutoxide) and tin compounds (such as, in particular, tin octoate).

In a twenty-fifth embodiment of the invention, which can be combined with all other embodiments, water is supplied in step (B), if at all, in an amount such that the mass fraction of water, based on the total mass of polyurethane product, catalyst, alcohol and water present in step (B) (i.e., present directly after mixing of the reactants, in other words before the start of the urethane cleavage reactions), is in a range from 0% to 5.0%, preferably in a range from 0% to 3.0%, more preferably in a range from 0% to 2.0%, very preferably in a range from 0% to 1.6%, with no further water being added during the reaction of the polyurethane product with the (mono- or polyhydric) alcohol in the presence of the catalyst.

In a twenty-sixth embodiment of the invention, which can be combined with all other embodiments, the reaction of the polyurethane product with the (mono- or polyhydric) alcohol in the presence of the catalyst in step (B) is carried out at a temperature in the range from 160° C. to 240° C.

In a twenty-seventh embodiment of the invention, which can be combined with all other embodiments, the polyol (i.e., the polyol which forms the polyol component of the polyurethane product) is selected from the group consisting of a polyether polyol, a polyester polyol, a polyetherester polyol, a polyethercarbonate polyol and a mixture of two or more of the aforesaid polyols. The polyol which forms the polyol component of the polyurethane product preferably comprises a polyether polyol, and more preferably the polyol is a polyether polyol (without other polyols different from polyether polyols; however, a mixture of two or more different polyether polyols is encompassed and is not outside the scope of this embodiment).

The embodiments briefly outlined above, and further possible configurations, of the invention are elucidated in more detail below. Different embodiments can be combined arbitrarily with one another unless the opposite is clearly apparent from the context to the skilled person.

FIG. 1 shows a schematic representation of the method of the invention, comprising the above-outlined preferred embodiments and recycle streams according to variant a, in the form of a simple block flow diagram. The definitions are as follows:
- 1: polyurethane product;
- 2: alcohol; 21: first alcohol phase; 22: alcohol fraction;
- 3: first product mixture
- 4: organic solvent; 41: first solvent phase; 42: second solvent phase; 43: third solvent phase;
- 5: aqueous wash liquid; 50: emulsion phase; 51: first aqueous phase; 52: second aqueous phase; 53: water phase;
- 6: polyol;
- 7: carbamate phase;
- 8: amine phase;
- 9: amine;
- 1000 step (A);
- 2000: step (B) (as alcoholysis);
- 3000: step (C); 3100: step (C.I); 3210: step (C.II.1); 3220: step (C.II.2); 3231: step (C.II.3.a); 3240: step (C.II.4);
- 4000: step (D); 4101: step (D.I.a); 4201: step (D.II.a); 4300: step (D.III).

FIG. 2 shows a schematic representation of the method of the invention, comprising the above-outlined preferred embodiments and recycle streams, according to variant b, in the form of a simple block flow diagram. The reference symbols used have the same definition as for FIG. 1. Additional definitions are as follows:
- 10: amine-water-alcohol mixture;
- 11: amine-alcohol mixture;
- 23: second alcohol phase;
- 54: evaporated water;
- 3232: step (C.II.3.b);
- 4102: step (D.I.b); 4202: step (D.II.b); 4212: first substep (evaporation of water) of step (D.II.b); 4222: second substep (evaporation of an alcohol fraction) of step (D.II.b).

The first aqueous phase is not obtained in every case, or is not obtained in every case as an independent fraction; in connection with the same, therefore, dashed arrows are used.

Preparation for Chemical Recycling

In step (A) of the method of the invention (=1000 in the figures) the chemical polyurethane product (1) for recycling is provided.

This may in principle be any kind of polyurethane product, in other words not only polyurethane foams but also polyurethane products from the CASE applications. With regard to the polyurethane foams, both flexible foams and rigid foams are suitable, with preference being given to flexible foams (for example, from old mattresses, upholstered furniture or car seats). In the case of polyurethane products from the CASE applications, polyurethane elastomers, polyurethane adhesives and polyurethane coatings are preferred. Among all polyurethane products, flexible polyurethane foams are particularly preferred.

Preference extends to those polyurethane products which in terms of the isocyanate component are based on an isocyanate selected from the group consisting of tolylene diisocyanate (TDI), the di- and polyisocyanates of the diphenylmethane series (MDI), pentane 1,5-diisocyanate (PDI), hexamethylene 1,6-diisocyanate (HDI), isophorone diisocyanate (IPDI) and xylylene diisocyanate (XDI), and mixtures of two or more of the aforesaid isocyanates. Particularly preferred are polyurethane products which in terms of the isocyanate component are based on TDI or on a mixture of TDI and MDI. Especially preferred polyurethane products are those which in terms of the isocyanate component are based only on TDI.

Preference extends to those polyurethane products which in terms of the polyol component are based on a polyol selected from the group consisting of a polyether polyol, a polyester polyol, a polyetherester polyol, a polyethercarbonate polyol, and a mixture of two or more of the aforesaid polyols. Terms such as "a polyether polyol", "a polyester polyol" and so on of course also encompass embodiments in which two or more different polyether polyols, polyester polyols and so on are used. Particularly preferred polyurethane products are those which in terms of the polyol component are based on a polyether polyol.

Viewed overall, therefore, preference for the method of the invention is given to flexible polyurethane foams based on TDI or on a mixture of TDI and MDI as isocyanate component and on a polyether polyol as polyol component.

Step (A) preferably comprises preparatory steps for the cleavage of the urethane bonds in step (B). This is, in particular, a mechanical comminution of the polyurethane products. Such preparatory steps are known to the skilled person; reference may be made, for example, to the literature cited in [1].

Chemical Cleavage of the Urethane Bonds

Step (B) of the method of the invention (=2000 in the figures) relates to the cleavage of the urethane bonds. Step (B) is carried out preferably as an alcoholysis (usually referred to in the literature as glycolysis; cf. 2. earlier on above), and is carried out in particular at a temperature in the range from 160° C. to 240° C., in other words as a reaction with an alcohol without the addition of significant fractions of water, in contrast to the process referred to as hydroglycolysis in the literature. Without the addition of significant fractions of water in this context means that water is not deliberately added in amounts which would bring about a hydroglycolysis (more accurately: hydroalcoholysis) to a significant extent. The ingress of small amounts of water, which may, for instance, be present in solution in the alcohol (2) used in step (B) may be entrained via the polyurethane product or may be used as a solvent for the catalyst, is not excluded by this phrase. Even when step (B) is carried out as an alcoholysis, therefore, the first product mixture may include water. It is likewise conceivable for small amounts of water to be added in step (B) before the start of the reaction of the polyurethane product with the alcohol in the presence of the catalyst, in order to bring any precipitated salts into solution. In this case it may be preferable to add carbon dioxide to the water to be added, and more particularly to saturate said water with carbon dioxide. This facilitates the dissolution of basic salts. Water is entrained via the aforementioned sources at most in an amount in step (B) such that the mass fraction of water, based on the total mass of polyurethane product, catalyst, alcohol and water (irrespective of origin) present in step (B) (i.e., present immediately after the mixing of the reactants, in other words before the start of the urethane cleavage reactions), is in a range from 0% to 5.0%, preferably in a range from 0% to 3.0%, more preferably in a range from 0% to 2.0%, very preferably in a range from 0% to 1.6%. Especially because in the method of the invention water which is consumed chemically by urethane cleavage reactions is not replaced by addition of further water during the reaction, these fractions are considerably smaller than usually employed for hydroalcoholyses, and so even in the case of the initial presence of small amounts of water, the reaction proceeding in step (B) very soon proceeds as a "pure alcoholysis".

It is also possible for water to be added for the purpose of dissolving salts after alcoholysis has taken place, in the cooled state (in particular after cooling to ambient temperature). In this case the mass fractions of water employed for this purpose may also be higher than described above, and in particular may be up to 20%, based on the total mass of the reaction mixture before this addition of water after alcoholysis has taken place, in the cooled state. Here as well it may be preferable for carbon dioxide to be added to the water to be added, and more particularly for this water to be saturated with carbon dioxide, in order to facilitate the dissolution of basic salts.

This alcoholysis yields a first product mixture (3), which comprises polyols, carbamates and the alcohol used (the alcohol is used in principle superstoichiometrically in step (B), and so the first product mixture always contains fractions of unreacted alcohol), any water (see the explanations above) and also—depending in particular on the nature of the polyurethane product provided in step (A)—any amines, more particularly the amine corresponding to an isocyanate of the isocyanate component. In the case of the reaction of the urethane bonds of a polyurethane product for recycling with the alcohol used in step (B), the polyols bound in the urethane bonds are released, and a new urethane is formed with the alcohol employed. For this new urethane, in the context of the present invention, for better distinction from the original urethane, the term carbamate is used. In the case of polyhydric alcohols, it is possible in principle for all alcohol groups to enter into carbamate formation reactions of this kind.

It is possible for the first product mixture already to contain amines. This is the case in particular when the polyurethane product provided in step (A) contains ureas in a significant amount (resulting, for example, from a water-blown foaming). Such ureas then react with the alcohol used in step (B), with release of amines.

The alcoholysis may in principle be carried out as known per se in the prior art.

Alcohols (2) suitable for step (B) are, in particular, methanol, ethanol, ethylene glycol, diethylene glycol, propylene glycol, dipropylene glycol, methylglycol, triethylene glycol, glycerol, 2-methyl-1,3-propanediol or mixtures of two or more of the aforesaid alcohols. Particular preference here is given to ethylene glycol, diethylene glycol, propylene glycol, dipropylene glycol, methylglycol, triethyleneglycol or mixtures of two or more thereof. Especially preferred is diethylene glycol.

Suitability as catalyst for step (B) is possessed in particular by alkali metal hydroxides, alkaline earth metal hydroxides, alkali metal salts of carboxylic acids (especially acetates), alkaline earth metal salts of carboxylic acids (especially acetates), Lewis acids (such as, in particular, dibutyltin dilaurate), organic amines (such as, in particular, diethanolamine), organometallic compounds (such as, in particular, titanium tetrabutoxide) and tin compounds (such as, in particular, tin octoate). Step (B) is preferably at temperatures in the range from 160° C. to 270° C. in the presence of 0.1 mass % to 5 mass-percent of catalyst, based on the mass of the added polyurethane product.

The first product mixture (3) obtained in this way may be (and preferably also is) a single-phase mixture. It is a great advantage of the present invention that the workup for isolating the products of the chemical cleavage of the urethane bonds, in other words at least the polyols (cf. step (C)), preferably the polyols and amines (cf. step (D)), is not based on achieving preliminary separation of the product mixture in step (B) itself, as is the case with many prior-art methods which are aimed at a two-phase product (see [1] and the literature cited therein). As a result, the degrees of freedom in the choice of the alcohol are significantly increased. A multiphase character to the first product mixture, however, is also not a disruption, and is not outside the scope of the invention.

Recovery of Polyols

Step (C) of the method of the invention (=3000 in the figures) comprises the recovery of polyols from the first product mixture obtained in step (B), in other words a removal of water between steps (B) and (C) as is not done in the prior-art "Ford Hydroglycolysis Process". For this purpose, in a first step (C.I) (=3100 in the figures), the first product mixture (3) obtained in step (B) is combined with an organic solvent (4), which is not fully miscible with the alcohol (2) used in step (B), so as to form two phases (=extraction of the first product mixture (3) with the organic solvent (4)).

Suitable organic solvents (4) for step (C.I) are, in particular, aliphatic hydrocarbons (such as, in particular, pentane, heptane, hexane, octane, nonane, decane or dodecane), alicyclic hydrocarbons (such as, in particular, cyclohexane, methylcyclohexane, methylcyclopentane or cyclopentane), aromatic hydrocarbons (such as, in particular, benzene or toluene), or mixtures of two or more of the aforesaid organic solvents. From the listing stated above, nonane is preferred among the aliphatic hydrocarbons, cyclohexane among the alicyclic hydrocarbons, and toluene among the aromatic hydrocarbons.

The alcohol (2) used in step (B) and the organic solvent (4) used in step (C.I) are in each case to be harmonized with one another such that in step (C.I) it is possible to perform a phase separation into a first alcohol phase (21) (comprising the alcohol (2) used plus the carbamates and any amines, more particularly the amine corresponding to an isocyanate of the isocyanate component) and a first solvent phase (41) (comprising polyols). For this purpose it is preferred to use an aromatic hydrocarbon as organic solvent (4) and ethylene glycol, diethylene glycol, propylene glycol, dipropylene glycol, methylglycol and/or triethylene glycol as alcohol. Having proven particularly appropriate are the combinations of nonane and diethylene glycol, of cyclohexane and diethylene glycol, and of toluene and diethylene glycol, with the two former combinations being particularly preferred. In the case of doubt, suitable combinations of alcohol and solvent can be ascertained quickly by simple preliminary tests.

Step (C.I) can be carried out with extraction facilities known per se to the skilled person, such as, in particular, static separators with and without internals, or else centrifugal separators. Proportions in the range from 1:2 to 4:1, based on the ratio of the organic solvent to first product mixture, are preferred in this case. Temperatures of 20° C. to 80° C., preferably at most 10 K beneath the boiling point of the solvent used, optionally slight overpressure by blanketing with nitrogen and prevention of gas formation; cross-current extraction and, in particular, countercurrent extraction for reducing the total amount of water, are suitable process conditions.

The first solvent phase (41) obtained after phase separation is worked up in step (C.II) with recovery of polyols (6). This workup preferably comprises a (single-stage or multistage) wash of the first solvent phase (41) with an aqueous washing liquid (5) in a step (C.II.1) (=3210). Here, after phase separation, a second solvent phase (42; comprising polyols), an "emulsion phase" (50; comprising organic constituents, particularly polyols, emulsified in aqueous washing liquid), and optionally a first aqueous phase (51) are obtained. It has in fact emerged that within this washing, in the phase separation, not only an organic phase (the second solvent phase 42) but regularly also a phase composed of aqueous washing liquid with organic constituents emulsified therein is formed, and even that, under certain circumstances, no (clear) aqueous phase at all is obtained. If a (clear) aqueous phase is obtained, it may either be separated off together with the emulsion constituents (in which case, in the terminology of the present invention, the entirety of emulsion constituents and clear constituents is referred to as emulsion phase), or the mixture obtained is separated into three phases: a second solvent phase, an emulsion phase (which in this case comprises no clear constituents), and a first aqueous phase (which comprises the clear constituents). In the first case, therefore, there are two fractions present after phase separation, and in the second case three fractions.

In the case of multistage washing in step (C.II.1), a phase separation is performed after each washing stage, and so initially there may be multiple "first aqueous phases" (=clear aqueous phases) obtained. A multistage wash in step (C.II.1) may be carried out according to principles known to the skilled person, in the form, for example, of a cross-current extraction and/or countercurrent extraction, more particularly as a countercurrent extraction. The fractions of emulsion phase which are obtained in each washing stage are combined. A (clear) aqueous phase obtained in the second or a further washing stage is used preferably, in the case of countercurrent extraction, as an aqueous washing liquid in the preceding washing stage in each case, whereas a (clear) aqueous phase obtained in the first washing stage is preferably added to the emulsion phases and supplied together with them to step (C.II.3) (irrespective of the variant in which this step is carried out), that step having already been briefly described earlier on above. In the case of cross-current extraction, the procedure can use all (clear) aqueous phases obtained, i.e. they can be added to the emulsion phases and be supplied together therewith to step (C.II.3).

The second solvent phase (42) thus obtained is worked up in step (C.II.2) (=3220) with the recovery of polyols, this being accomplished preferably by means of distillation and/or stripping with a stripping gas (such as, in particular, nitrogen or steam, preferably nitrogen). In one embodiment this step comprises a distillation in an evaporator selected from the group consisting of falling film evaporators, thin film evaporators, flash evaporators, rising film evaporators, natural circulation evaporators, forced circulation evaporators and kettle evaporators. Such distillation is preferably followed by steam stripping.

The emulsion phase obtained in step (C.II.1) (irrespective of whether this phase takes the form of a pure emulsion phase or of a mixture of emulsion constituents and clear aqueous phase) comprises polyols and is therefore preferably worked up further. For this purpose it has been found appropriate to combine the emulsion phase in a step (C.II.3) with an organic solvent (more particularly the same solvent as used in step (B)) and then to separate the phases (=extraction of the emulsion phase with organic solvent to break the emulsion). For the implementation of this step (C.II.3) there are a number of options:

In a first variant (variant a; 3231; cf. FIG. 1) the emulsion is broken by using, as described above, (only) the organic solvent (4). Phase separation produces a third solvent phase (43) and a second aqueous phase (52). The third solvent phase (43) can be returned in a step (C.II.4) (=3240) to the step (C.I) (3100; use as extraction solvent) or step (C.II.1) (3210; combination with the first solvent phase for washing).

In a second variant (variant b; 3232; cf. FIG. 1) the emulsion is broken by using not only the organic solvent but also the first alcohol phase 21 (partly or completely, preferably completely) obtained in step (C.I). Phase separation produces a third solvent phase (43) and a second alcohol phase (22), which then contains the carbamates and/or amines from the first alcohol phase.

Recovery of Amines

The invention preferably also comprises step (D) (=4000 in the figures), the recovery of amines, comprising a step of hydrolysis of the carbamates formed in step (B).

In the first variant (variant a; cf. also FIG. 1) this is accomplished preferably by first evaporating an alcohol fraction (22) in a step (D.I.a) (=4101 in FIG. 1) from the first alcohol phase (21) obtained in step (C.I), with this alcohol fraction (22) optionally additionally comprising additives from the polyurethane product and/or follow-on products of the catalyst used in step (B). This evaporation may take place in conjunction with a removal, before or after the evaporation, of organic solvent present in the alcohol phase, with the term "before or after" also embracing a configuration of the solvent removal in which water and solvent are distilled into a common receiver and then separated from one another by phase separation. Organic solvent recovered in a solvent removal step of this kind can be returned to the process—to the third solvent phase (43), for example. The alcohol fraction (22) obtained in the evaporation is preferably returned (optionally after purification) to step (B), where it is used as a constituent of the alcohol employed for the urethane cleavage.

The evaporation leaves a carbamate phase (7). This phase is hydrolyzed in a step (D.II.a) (4201 in FIG. 1) with a water phase (53), in particular a washing water phase, to give an amine phase (an amine-water mixture; 8 in FIG. 1). This generally leaves impurities originating from the polyurethane product at least partly in this amine phase (8). The hydrolysis can be (and preferably is) carried out in the presence of a catalyst, in which case the same catalysts as stated earlier on above for step (B) are suitable. The second aqueous phase (52) obtained in step (C.II.3.a) is preferably used as a constituent (optionally the sole constituent) of the water phase for use in step (D.II.a). If the phase separation in step (C.II.1) is carried out to give the first aqueous phase (51), it is possible in one embodiment of the invention to use this first aqueous phase as a constituent (more particularly in combination with the second aqueous phase (52) obtained in step (C.II.3.a), but optionally also as sole constituent) of the water phase to be used in step (D.II.a) (washing water phase; 53). If step (C.II.1) is carried out in multiple stages, then in the case of the countercurrent extraction described earlier on above, only the "first aqueous phase" obtained in the first washing stage, in particular, is used in this way in step (D.II.a). In the case of the cross-current extraction, it is possible to use all "first aqueous phases" in this way in step (D.II.a).

In principle, however, all customary water sources (including, for example, fresh water or condensed steam) can be used as water phase 53 for step (D.II.a).

In the second variant (variant b; cf. also FIG. 2) the recovery of the amines in step (D) starts from the second alcohol phase (23) (since the carbamates or amines originally present in the first alcohol phase (21) have been transferred into said phase in step (C.II.3.b)). In this variant, preferably the hydrolysis step (presently step (D.I.b)=4102 in FIG. 2) first and only then the evaporation step (presently step (D.II.b)=4202) are carried out. The hydrolysis produces an amine-water-alcohol mixture. Concerning the implementation of the step, reference may be made to explanations presented above in the context of the first variant.

In the next step (step (D.II.b)=4202) the amine-water-alcohol mixture (10) is subjected to an evaporation procedure. This takes place preferably in two stages, with evaporation in a first stage (4212) of water (54), to leave an amine-alcohol mixture (11), and evaporation in a second stage (4222) of an alcohol fraction (22), to leave an amine phase (8). In this variant as well, a removal of any organic solvent present may take place before or after the evaporation (i.e., the evaporation of water), with the term "before or after" also embracing a configuration of the solvent removal in which water and solvent are distilled into a joint receiver and then separated from one another by phase separation. Organic solvent recovered in a solvent removal step of this kind can be returned to the process—to the third solvent phase, for example. The evaporated water may likewise be returned to the process, and specifically it can be used in particular as a constituent of the water phase employed in step (D.I.b). Additionally required water may come from other customary water sources (e.g., fresh water or condensed steam). The alcohol fraction obtained in the second evaporation stage is preferably returned (optionally after purification) to step (B), where it is used as a constituent of the alcohol employed for the urethane cleavage.

Independently of the variant selected, the amine (9) is finally obtained in a step (D.III) from the amine phase (8) obtained in the hydrolysis (step (D.I.b) or step (D.II.a)). Depending on the nature of the amine, this workup preferably comprises a phase separation and/or distillation. Where the amine phase still contains substantial fractions of alcohol employed in step (B), that alcohol is separated off as part of step (D.III) and can be returned to step (B).

In one particularly advantageous embodiment of the invention, which offers an economic and environmentally benign outlet for impurities originating from the polyurethane product, the recovery of the amine from the amine phase is tied into the workup of newly prepared amine, by the admixing to the amine phase of a crude amine product fraction originating from the new preparation of the amine.

(1) This particularly advantageous embodiment of the method of the invention can be applied in particular when the isocyanate component of the polyurethane product is based on exactly one isocyanate class. In such a scenario, the amine phase (8) recovered from the polyurethane product in the method of the invention comprises only the amines corresponding to the isocyanates of the isocyanate class (and no others), and can therefore readily be admixed with a crude product fraction which is obtained in a process for the preparation (that is, for the new preparation, to be distinguished from the recovery by recycling) of the same amine (of the same amine class).

(2) In the scenario in which the isocyanate component of the polyurethane product is based on isocyanates of different isocyanate classes, the stated particularly advantageous embodiment of the method of the invention can be applied in particular when the boiling points of the amine classes corresponding to the isocyanate classes differ in such a way that (exactly) one amine class boils at a significantly lower temperature (i.e., by a temperature at least 20° C. lower) than the lowest-boiling amine class otherwise also present. In such a scenario this embodiment can be used to recover the lowest-boiling amine class in the course of the workup of newly prepared amine of the same amine class, with amines of higher-boiling amine classes being removed in the workup, by transferring them into bottom fractions and/or into residues (see later on below for details). For example, in the case of a polyurethane product which in terms of its isocyanate component is based on a mixture of TDI and MDI, the amine phase can be tied into the workup of a TDA crude product fraction, by mixing the amine phase with such a TDA crude product fraction and working it up together with that fraction. In this workup, the newly prepared TDA and the TDA coming originally from the polyurethane product are obtained jointly, while the MDA from the polyurethane product is removed as a bottom fraction in the distillative purification. From this bottom fraction it may either be obtained in a further distillation step (at least the diamines of the diphenylmethane series), or the (physical) recovery of the MDA is omitted, with the MDA being allowed to pass into the solid residue from TDA preparation (see below for details).

The detailed description which follows is oriented in terms of language, for the sake of simplicity, to scenario (1), though is also applicable to scenario (2).

In the preparation of amines which are significant for polyurethane synthesis, there are crude product fractions regularly produced—for example, as the bottom fraction in a distillation for purifying the target amine or else as a crude product of the preparation itself (possibly after removal of solvent), which, in addition to the desired amine, also comprise impurities and/or coproducts (such as, for example, organic impurities boiling at a higher point than the amine (referred to as high boilers), organic impurities boiling more readily than the amine (referred to as low boilers) and/or water (of reaction)). In this particularly preferred embodiment of the invention, with the recovery of the amine from the amine phase tied into the workup of newly prepared amine, therefore, a crude product fraction of this kind (which is obtained anyway in the amine preparation) is provided in a step (E) and in a step (D.III.1) is mixed with the amine phase from step (D.III), with subsequent workup to recover the amine.

Crude product fractions of this kind, provided in step (E), are obtained in particular as follows:

(E.1) catalytically (e.g., in the presence of Raney nickel catalysts) hydrogenating the nitro compound corresponding to the amine (for example, hydrogenating dinitrotoluene to tolylenediamine), optionally in the presence of a solvent (for example, methanol), to give, optionally after removal of solvent employed, a crude product fraction (as crude hydrogenation product) which in addition to the amine also comprises high and low boilers and water;

(E.II) removing water from this crude product, to give a method product (largely) freed of water;

(E.III) distillatively purifying the method product (largely) freed of water, to give a distillate fraction of the desired amine and a crude product fraction (as bottom fraction of the distillation) comprising organic impurities boiling at a higher point than the amine, and also further fractions of the desired amine.

Steps (E.I) to (E.III) are represented schematically in FIG. 3. The definitions are as follows:

12: water used for the hydrogenation;
13: nitro compound corresponding to the amine;
14: crude hydrogenation product;
15: water removed;
16: water-depleted method product;
17: distillate fraction of the amine formed in the hydrogenation;
18: bottom fraction of the distillation;
5100: hydrogenation (step (E.I)); 5200: water removal (step (E.II)); 5300: distillation (step (E.III)).

In one embodiment of the invention the amine phase (8) is mixed with the crude hydrogenation product (14) obtained in step (E.I) (said crude product having merely been freed of any solvent present), meaning that the crude product fraction from step (E) is obtained as the crude hydrogenation product (step (E.I)=5100). The amine (9) from the polyurethane product is distilled off here together with the amine (17) from the (new) preparation. This is shown in FIG. 4, in which reference symbols already used have the same meaning as before, and 4310 stands for the step (D.III.1).

In this embodiment the amine phase (8) is admixed to the crude hydrogenation product from step (E.I), in particular before or in the step of water removal (step (E.II)), with the removal of water taking place preferably by distillation, as described in EP 0 236 839 A2, for example. In this embodiment, then, the crude product fraction of the amine corresponding to the isocyanate comprises not only the amine but also, in addition, organic impurities boiling more readily than the amine, and also water, and is passed to a distillation for the removal of water. This distillation produces a bottom fraction comprising the amine, organic impurities boiling more readily than the amine, and organic impurities boiling at a higher point than the amine, and also a top fraction comprising water removed (possibly together with residual amounts of organic impurities boiling more readily than the amine) The impurities originating from the polyurethane product pass into the bottom fraction in the water removal step—step (E.II). In the subsequent amine distillation step—step (E.III)—they likewise pass into the bottom fraction.

In a further embodiment of the invention, the amine phase (8) is admixed to the bottom fraction (18) obtained in step (E.III), meaning that the crude product fraction from step (E) is obtained as the bottom fraction of the amine distillation (step (E.III)=5300). Examples of such crude product fractions obtained as bottom fractions of the amine distillation are the streams 5, 50 and 51 in FIGS. 1 to 3 of international patent application WO 02/48075 A1, and these streams may be worked up further as outlined in the specification or else, in divergence from that specification, in drying apparatuses as outlined below. Another example of such crude product fractions is the stream P4 in FIGS. 1 to 5 of the U.S. patent specification U.S. Pat. No. 7,307,190 B2. Bottom fractions of this kind are worked up in the prior art for recovery of amine they contain. For this purpose, the bottom fraction is concentrated in drying apparatuses to give a solid residue, with amine being distilled off and amenable, accordingly, to recovery. In the stated embodiment of the method of the invention, then, by mixing of the amine phase (8) with the bottom fraction (18), the recovery of amine (20) originating from the (new) preparation of the amine is associated with the recovery of the amine (9) originating from the polyurethane product. In this case, therefore, besides the amine (20, 9), a solid residue is obtained which comprises the high boilers present in the crude product fraction, and the impurities originating from the polyurethane product. This is shown in FIG. 5, in which reference symbols already used have the same meaning as before and 6000 stands for the workup of residue. Apparatus suitable for such workup is known to the skilled person and described for example in patent applications DE 10 2012 108 261 A1 (kneader-dryer, also mentioned in U.S. Pat. No. 3,307,190 B2 for the workup of the stream P4), EP 2 540 702 A2 (fluidized bed dryer) and WO 2018/114846 A1 (various types of dryer). (In the stated DE, EP and WO specifications, the workup of TDI residues is described; the apparatus, however, can also be used for the workup of TDA residues.) The solid residues obtained in a workup procedure of this kind may be processed further as before; for example, they may be burned, gassed (that is, in contrast to the burning, heated under conditions of oxygen deficit), or pyrolyzed.

With the particularly advantageous embodiment of the invention as outlined above, therefore, success is achieved in transferring impurities from the polyurethane product into a residue which is present in any case, thereby reducing or avoiding additional waste streams.

Example

Analysis

The compositions of mixtures of compounds were determined by means of H-NMR/2D-NMR spectroscopy with an internal standard. Percentages relating to the composition of mixtures of compounds are mass fractions based on the total mass of the mixture of compounds in question.

Experiments

A TDI-based polyurethane foam was subjected to an alcoholysis with diethylene glycol (DEG) in a ratio by mass of 1:1 (steps (A) and (B) of the method of the invention). The first product mixture obtained accordingly had the following composition (mass fractions based on the total mass of the first product mixture):

First Product Mixture:

38% polyol, 42% DEG and in total 20% TDA and carbamates.

70 g of this first product mixture were introduced into a sample bottle, and 160 g of toluene were added. The bottle was closed and shaken by hand for 5 minutes (extraction according to step (C.I) of the method of the invention). The product mixture obtained had two phases. The upper, light phase contained primarily polyol and toluene (first solvent phase); the lower, heavy phase contained primarily DEG, amines or carbamate compounds (alcohol phase from step (C.I)=first alcohol phase). The two phases were separated from one another in a separating funnel. Around 145 g of solvent phase and around 76 g of alcohol phase were obtained. The compositions of the phases were as follows:
Light Phase (First Solvent Phase):
  11% polyol, 85% toluene, 3% DEG, balance TDA and carbamates.
Heavy Phase (First Alcohol Phase):
  4% polyol, 36% toluene, 45% DEG, balance TDA and carbamates.

120 g of the first solvent phase were transferred to a sample bottle, and 120 g of fully demineralized water (FD water) were added. The bottle was closed and shaken by hand for 5 minutes. A light phase of around 70 g (second solvent phase) and a heavy phase of around 165 g (emulsion phase) were separated from one another (washing according to step (C.II.1) of the method of the invention). The composition of the light phase was as follows:
Light Phase (Second Solvent Phase):
  11% polyol, 85% toluene, around 2.7% water, 0.2% DEG, balance TDA and carbamates.

In a test of principle, the second solvent phase was heated at 150° C. and 30 mbar using a rotary evaporator, and was freed from large portions of the solvent. The following composition was found for the crude polyol which remained:
Crude Polyol:
  93% polyol, 0.3% toluene, around 0.2% water, 4% DEG, balance TDA and carbamates.

A removal of interfering components (especially TDA and carbamates) is readily possible (step (C.II.2)) with the techniques of distillation technology.

The emulsion phase was mixed in a sample bottle with the first alcohol phase (from step (C.I)), and 150 g of toluene were added to 50 g of the resulting mixture. The sample bottle was closed, and was shaken by hand for 5 minutes (extraction of the emulsion phase for the purpose of breaking the emulsion, according to step (C.II.3.b) as shown in FIG. 2). After a short separation time of less than 2 minutes, there were two cleanly separated phases without emulsion, which could be easily separated from one another. The phases thus obtained had the following compositions:
Light Phase (Third Solvent Phase):
  0.4% polyol, 98.2% toluene, around 1% water, 0.1% DEG, balance TDA and carbamates.
Heavy Phase (Second Alcohol Phase):
  0.6% polyol, 4% toluene, around 48% water, 37% DEG, balance TDA and carbamates.

The invention claimed is:

1. A method for recovering raw materials from polyurethane products, comprising:
  (A) providing a polyurethane product based on an isocyanate component and a polyol component;
  (B) reacting the polyurethane product with an alcohol in the presence of a catalyst, to give a first product mixture containing unreacted alcohol, polyols and carbamates and optionally water;
  (C) working up the first product mixture, the working up of the first product mixture comprising:
    (C.I) combining the first product mixture, obtained in step (B), and without prior removal of any water present in the first product mixture, with an organic solvent which is not fully miscible with the alcohol used in step (B), and performing phase separation into a first alcohol phase and a first solvent phase; and
    (C.II) working up the first solvent phase to recover the polyols;
  and optionally
  (D) working up the first alcohol phase, the working up of the first alcohol phase comprising a step of hydrolyzing the carbamates.

2. The method as claimed in claim 1, in which step (C.II) comprises:
  (C.II.1) scrubbing the first solvent phase with an aqueous scrubbing liquid and performing phase separation into a second solvent phase, an emulsion phase and optionally a first aqueous phase; and
  (C.II.2) working up the second solvent phase to recover the polyols.

3. The method as claimed in claim 2, in which step (C.II) further comprises:
  (C.II.3) combining the emulsion phase
    (C.II.3.a) with organic solvent and performing phase separation into a third solvent phase and a second aqueous phase, or
    (C.II.3.b) with the first alcohol phase and with organic solvent and performing phase separation into a third solvent phase and a second alcohol phase; and
  (C.II.4) returning the third solvent phase to step (C.I) or step (C.II.1).

4. The method as claimed in claim 3, comprising step (C.II.3.a) and step (D), wherein step (D) comprises:
  (D.I.a) evaporating an alcohol fraction from the first alcohol phase, to leave a carbamate phase;
  (D.II.a) hydrolyzing the carbamate phase with a water phase, to give an amine phase; and
  (D.III) recovering from the amine phase an amine which corresponds to an isocyanate of the isocyanate component.

5. The method as claimed in claim 3, comprising step (C.II.3.b) and step (D), wherein step (D) comprises:
  (D.I.b) hydrolyzing the second alcohol phase with a water phase, to give an amine-water-alcohol mixture;
  (D.II.b) evaporating water from the amine-water-alcohol mixture, to give an amine-alcohol mixture, followed by evaporating an alcohol fraction from the amine-alcohol mixture, to leave an amine phase; and
  (D.III) recovering from the amine phase an amine which corresponds to an isocyanate of the isocyanate component.

6. The method as claimed in claim 4, in which the water phase used in step (D.II.a) comprises the second aqueous phase obtained in step (C.II.3.a).

7. The method as claimed in claim 4, in which in step (C.II.1) the phase separation is carried out to give the first aqueous phase, and the water phase used in step (D.II.a) or in step (D.I.b) comprises the first aqueous phase.

8. The method as claimed in claim 4, in which the alcohol fraction obtained in step (D.I.a) or in step (D.II.b) is returned to step (B).

9. The method as claimed in claim 4, further comprising:
  (E) providing a crude product fraction of an amine, which is the same amine which is recovered in step (D.III), where the crude product fraction comprises this amine and organic impurities boiling at a higher point than this amine; and
  where step (D.III) comprises:
    (D.III.1) mixing the amine phase with the crude product fraction and working up the resulting mixture, to give the amine contained in the crude product fraction together with the amine recovered from the amine phase.

10. The method as claimed in claim 1, in which in step (C.I)
the organic solvent is selected from the group consisting of aliphatic hydrocarbons, alicyclic hydrocarbons, aromatic hydrocarbons, and mixtures of two or more of the aforesaid organic solvents, and
the alcohol is selected from the group consisting of methanol, ethanol, ethylene glycol, diethylene glycol, propylene glycol, dipropylene glycol, methyl glycol, triethylene glycol, glycerol, 2-methyl-1,3-propanediol, and mixtures of two or more of the aforesaid alcohols.

11. The method as claimed in claim 1, in which the catalyst in step (B) is selected from the group consisting of alkali metal hydroxides, alkaline earth metal hydroxides, alkali metal salts of carboxylic acids, alkaline earth metal salts of carboxylic acids, Lewis acids, organic amines, organometallic compounds, and tin compounds.

12. The method as claimed in claim 1, in which the polyurethane product is a polyurethane foam, a polyurethane elastomer, a polyurethane adhesive or a polyurethane coating.

13. The method as claimed in claim 1, in which water in step (B) is supplied, if at all, in an amount such that the mass fraction of water, based on the total mass of polyurethane product present in step (B), catalyst, alcohol and water, is in a range from 0% to 5.0%, with no further water being added during the reaction of the polyurethane product with the alcohol in the presence of the catalyst.

14. The method as claimed in claim 9, in which either:
(1) the crude product fraction is taken from a bottom fraction of a distillation to purify the amine contained in the crude product fraction, where in step (D.III.1) additionally a solid residue is obtained which comprises the organic impurities boiling at a higher point than the amine contained in the crude product fraction, or
(2) in which:
  (A) the crude product fraction is taken from the crude product of a method for producing the amine contained in the crude product fraction and comprises (i) the organic impurities boiling at a higher point than the amine contained in the crude product fraction, (ii) organic impurities boiling more readily than the amine contained in the crude product fraction, and (iii) water, and
  (B) the crude product fraction is distilled to obtain:
    (i) a bottom fraction comprising the amine contained in the crude product fraction, organic impurities boiling more readily than the amine contained in the crude product fraction, and organic impurities boiling at a higher point than the amine contained in the crude reaction product, and
    (ii) a top fraction comprising water.

15. The method as claimed in claim 14, in which step (E) comprises:
(E.I) catalytically hydrogenating the nitro compound corresponding to the amine present in the crude product fraction, to give a crude product comprising (i) the amine contained in the crude product fraction, (ii) organic impurities boiling at a higher point than the amine contained in the crude product fraction, (iii) organic impurities boiling more readily than the amine contained in the crude product fraction, and (iv) water;
(E.II) removing water from the crude product to give a water-depleted method product; and
(E.III) distilling the water-depleted method product to give (i) a distillate fraction of the amine present in the crude product fraction, and (ii) a bottom fraction containing organic impurities boiling at a higher point than the amine contained in the crude product fraction.

* * * * *